United States Patent
Liang

(10) Patent No.: US 12,101,824 B2
(45) Date of Patent: *Sep. 24, 2024

(54) UPLINK CARRIER SELECTION FOR PRACH TRANSMISSION BETWEEN A NR DEDICATED CARRIER AND A LTE/NR SHARED CARRIER

(71) Applicant: NEC CORPORATION, Tokyo (JP)

(72) Inventor: Caroline Liang, Tokyo (JP)

(73) Assignee: NEC Corporation (JP)

( * ) Notice: Subject to any disclaimer, the term of this patent is extended or adjusted under 35 U.S.C. 154(b) by 0 days.

This patent is subject to a terminal disclaimer.

(21) Appl. No.: 18/448,560

(22) Filed: Aug. 11, 2023

(65) Prior Publication Data
US 2023/0397261 A1    Dec. 7, 2023

Related U.S. Application Data

(63) Continuation of application No. 17/546,635, filed on Dec. 9, 2021, now Pat. No. 11,765,775, which is a
(Continued)

(30) Foreign Application Priority Data

Jun. 16, 2017    (GB) ..................... 1709678

(51) Int. Cl.
*H04W 74/0833* (2024.01)
*H04B 1/40* (2015.01)
(Continued)

(52) U.S. Cl.
CPC ... *H04W 74/0833* (2013.01); *H04W 72/0453* (2013.01); *H04W 74/004* (2013.01); *H04B 1/40* (2013.01); *H04W 84/042* (2013.01)

(58) Field of Classification Search
CPC .......... H04W 72/0453; H04W 72/0413; H04L 5/0053

See application file for complete search history.

(56) References Cited

U.S. PATENT DOCUMENTS 11,083,020 B2    8/2021  Pelletier et al.
11,765,775 B2 *  9/2023  Liang ................... H04W 72/23
                                                            455/450
(Continued)

FOREIGN PATENT DOCUMENTS

CN    102150466 A    8/2011
CN    106792869 A    5/2017
(Continued)

OTHER PUBLICATIONS

Written Opinion for PCT/JP2018/022568 dated Sep. 4, 2018 [PCT/ISA/237].
(Continued)

*Primary Examiner* — Kevin Kim
(74) *Attorney, Agent, or Firm* — NEC-IPC

(57) ABSTRACT

A cellular communication system is disclosed in which user equipment (UE) initiates a random access channel (RACH) procedure by sending one or more messages, comprising a random access preamble, to a 5G base station, using one or more uplink carriers of a plurality of such carriers available for use by the UE. The base station selects an uplink carrier for initial access by the UE and informs the UE, as part of the RACH procedure, of the UL carrier selected by the base station.

5 Claims, 6 Drawing Sheets

Related U.S. Application Data continuation of application No. 16/623,006, filed as application No. PCT/JP2018/022568 on Jun. 13, 2018, now Pat. No. 11,546,943.

(51) Int. Cl.
*H04W 72/0453* (2023.01)
*H04W 74/00* (2009.01)
*H04W 84/04* (2009.01)

(56) References Cited

U.S. PATENT DOCUMENTS

| | | | |
|---|---|---|---|
| 2010/0113004 | A1 | 5/2010 | Cave et al. |
| 2010/0130219 | A1 | 5/2010 | Cave et al. |
| 2012/0039284 | A1 | 2/2012 | Barbieri et al. |
| 2012/0208583 | A1 | 8/2012 | Chung et al. |
| 2013/0034067 | A1 | 2/2013 | Umesh et al. |
| 2013/0064191 | A1 | 3/2013 | Jeong et al. |
| 2014/0029595 | A1 | 1/2014 | Tsuboi et al. |
| 2017/0347350 | A1 | 11/2017 | Takeda et al. |
| 2018/0351704 | A1 | 12/2018 | Papasakellariou et al. |
| 2019/0327069 | A1 | 10/2019 | Novlan et al. |
| 2020/0120618 | A1 | 4/2020 | Pelletier et al. |

FOREIGN PATENT DOCUMENTS

| | | |
|---|---|---|
| EP | 2 536 235 A1 | 12/2012 |
| EP | 2 733 874 A2 | 5/2014 |
| EP | 3429307 A1 | 1/2019 |
| JP | 2012-227746 A | 11/2012 |
| JP | 2013-534395 A | 9/2013 |
| WO | 2010/013970 A2 | 2/2010 |
| WO | 2010/124228 A2 | 10/2010 |
| WO | 2011/035420 A1 | 3/2011 |
| WO | 2016/072216 A1 | 5/2016 |

OTHER PUBLICATIONS

Considerations of NPRACH transmission on non-anchor NB-IOT, Intel Corporation, 3GPP TSG-RAN WG2 #95, R2-164989, Aug. 22-26, 2016, 5 pages.

Considerations of NR UL operation, Huawei, HiSilicon, 3GPPTSG RAN WG1 Meeting #88, R1-1701668, Feb. 13-17, 2017, 5 pages.
United Kingdom Search Report for GB1709678.5 dated Nov. 7, 2017.
NGMN 5G White Paper V1.0 by the Next Generation Mobile Networks (NGMN) Alliance, https://www.ngmn.org/5g-white-paper.html., 2015, 7 pages.
International Search Report for PCT/JP2018/022568 dated Sep. 4, 2018 [PCT/ISA/210].
"Overview of NR UL for LTE-NR coexistence", Huawei, HiSilicon, 3GPPTSG RAN WG1 Meeting #89, R1-1709383, May 15-19, 2017, 15 pages.
US Office Action for U.S. Appl. No. 17/546,635 mailed on Nov. 10, 2022.
Japanese Office Action for JP Application No. 2021-116844 mailed on Aug. 9, 2022 with English Translation.
CMCC, "Way forward on the support of Supplementary Uplink in NR", 3GPP TSG RAN WG1 #89, R1-1709587, May 15-19, 2017.
ZTE, "Consideration for PRACH on multi-carrier in NB-IoT", 3GPP TSG-RAN WG2 #95, R2-164859, Aug. 22-26, 2016.
Ericsson, "Random access on non-anchor carrier", 3GPP TSG RAN WG2 #96, R2-167621, Nov. 14-18, 2016.
Research In Motion, UK Limited, "Aperiodic SRS with Configurable Duration", 3GPP TSG-RAN WG1 #61, R1-103071, May 10-14, 2010.
European Office Communication for EP Application No. 18737431.9 mailed on Dec. 17, 2021 with English Translation.
ZTE, "Discussion on resources selection for PRACH triggered by a PDCCH order in eNB-iot", 3GPP Draft, 3GPPT TSG-RAN WG2 Meeting#98, R2-1705417, May 15-19, 2017, China.
Japanese Office Action for JP Application No. 2019-569506 mailed on Dec. 8, 2020 with English Translation.
Motorola Mobility et al., "RACH configuration and procedure", 3GPP TSG RAN WG1 Meeting #89, R1-1708305, pp. 14 May 19, 2017, China.
Office Action issued Feb. 7, 2022 in U.S. Appl. No. 16/623,006.
Office Action issued Apr. 23, 2021 in U.S. Appl. No. 16/623,006.
US Notice of Allowance for U.S. Appl. No. 16/623,006 dated Jul. 27, 2022.
Chinese Office Action for CN Application No. 201880052825.4, mailed on Feb. 18, 2023 with English Translation.

\* cited by examiner

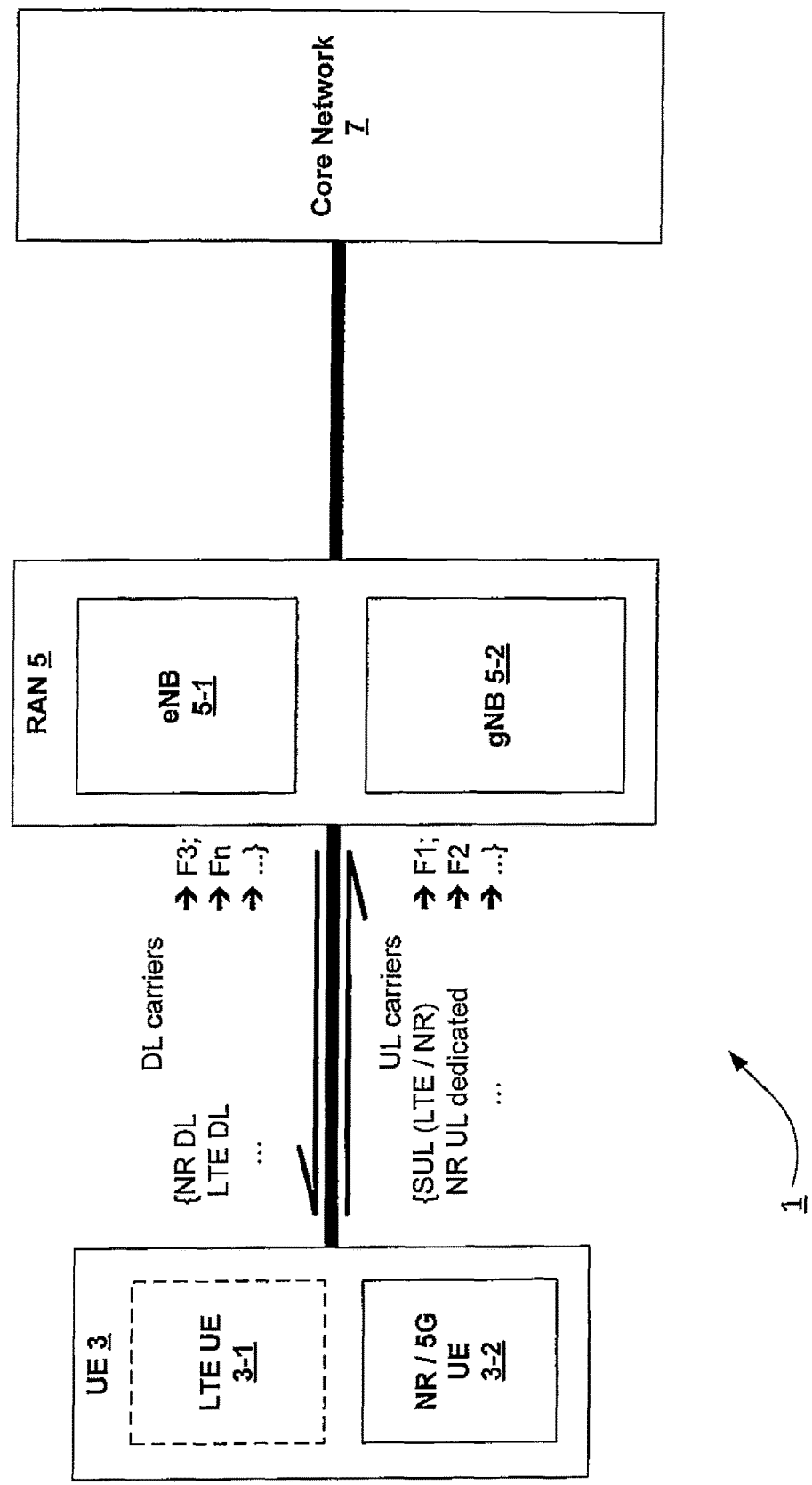
[Fig. 1]

[Fig. 2]
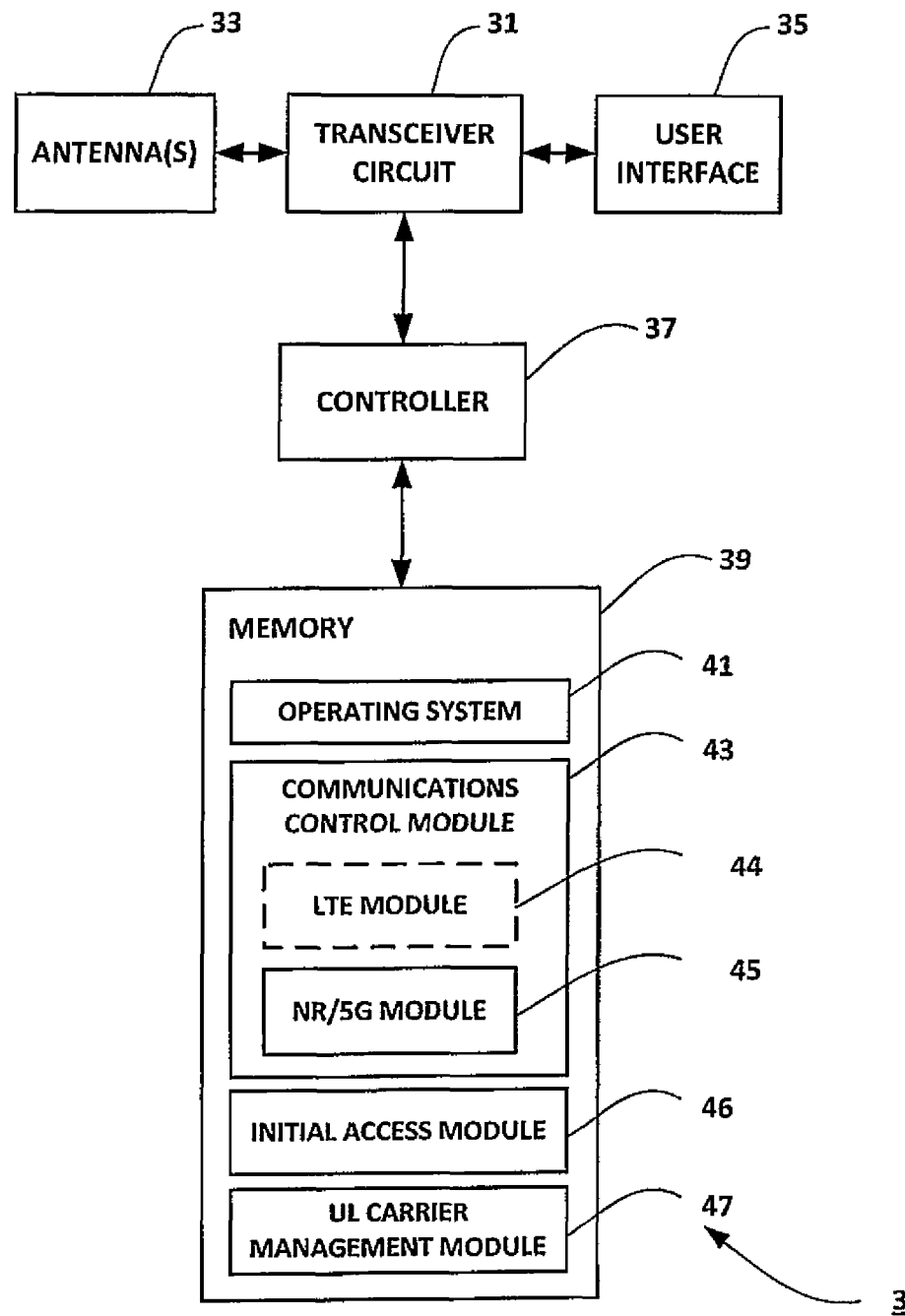

[Fig. 3]
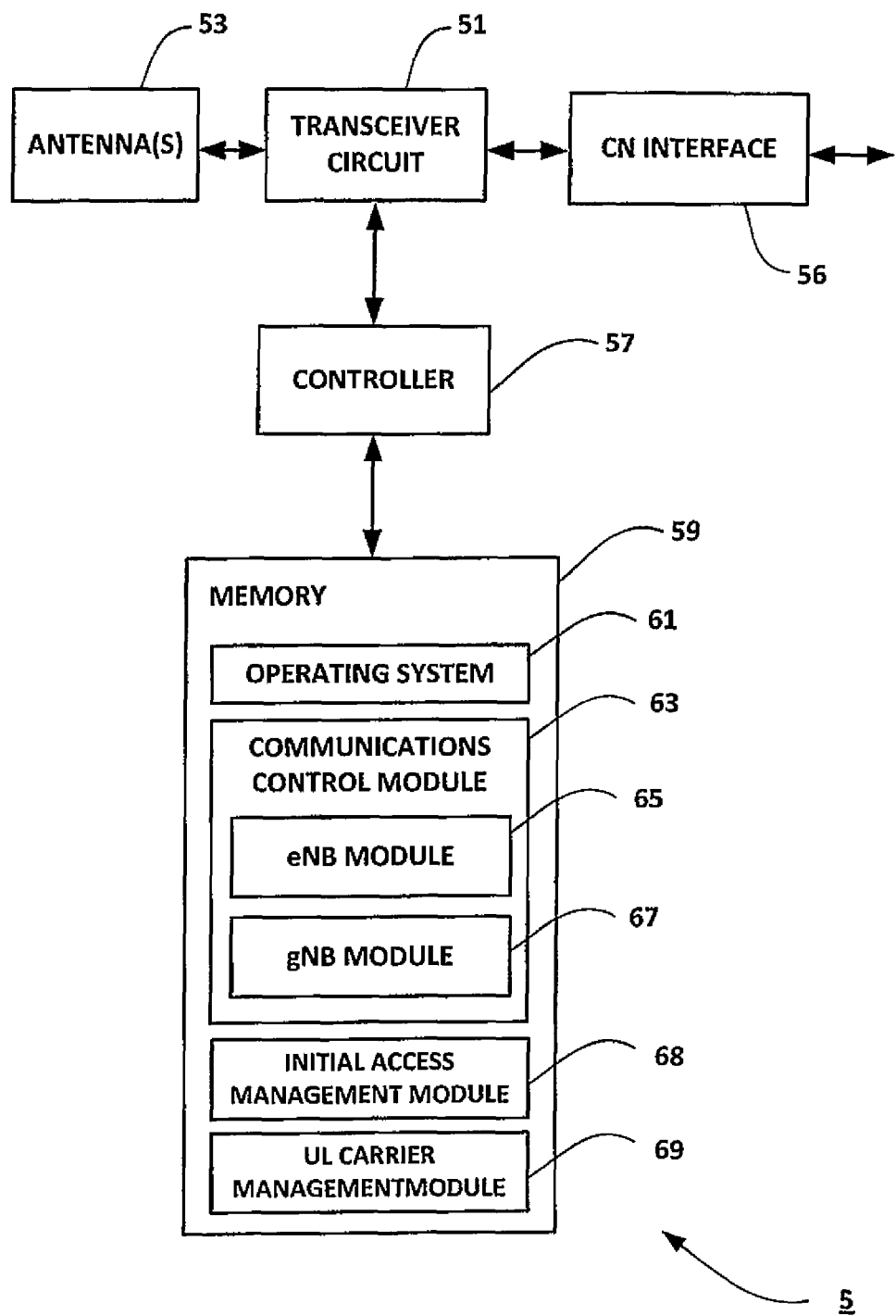

[Fig. 4]
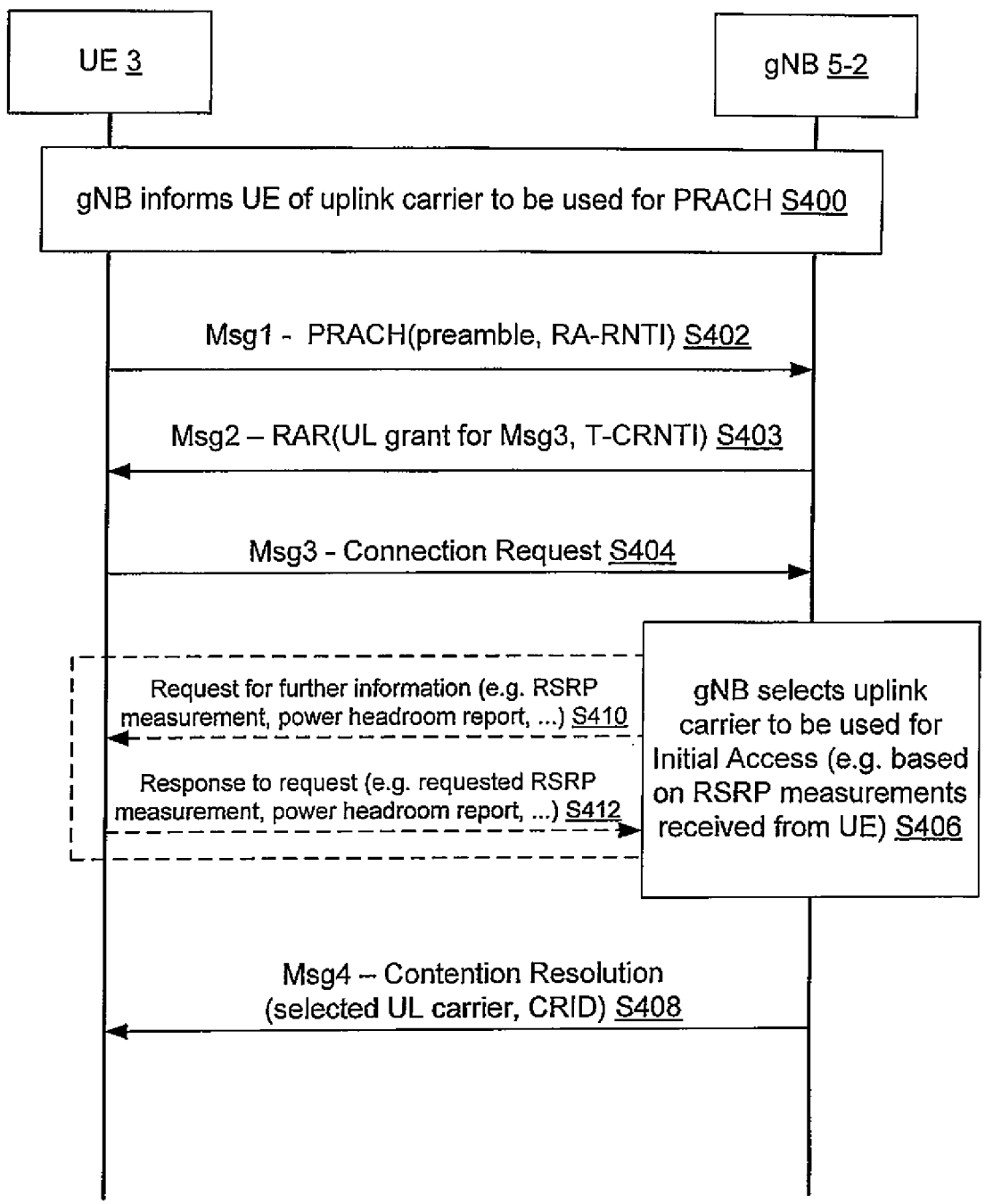

[Fig. 5]
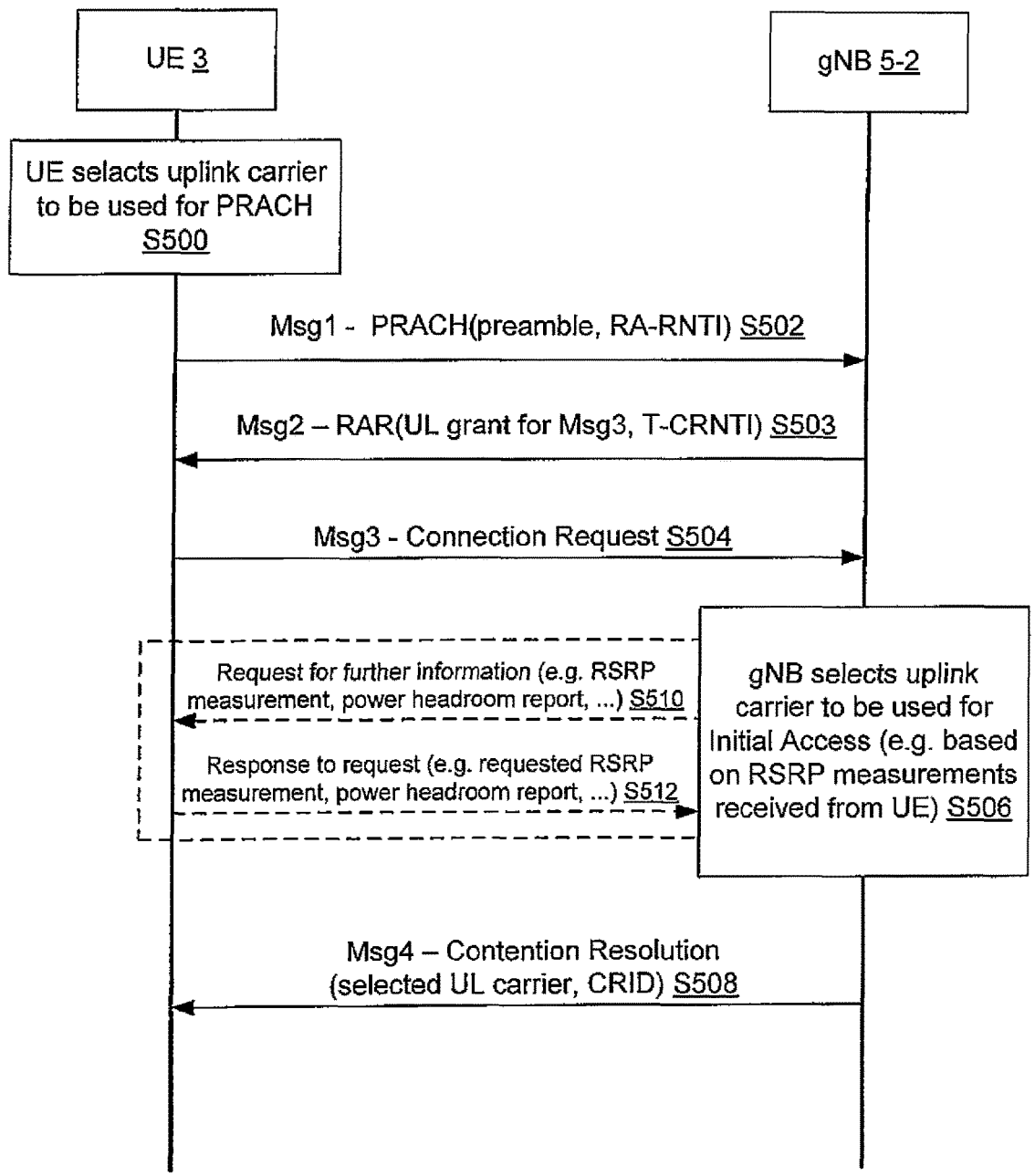

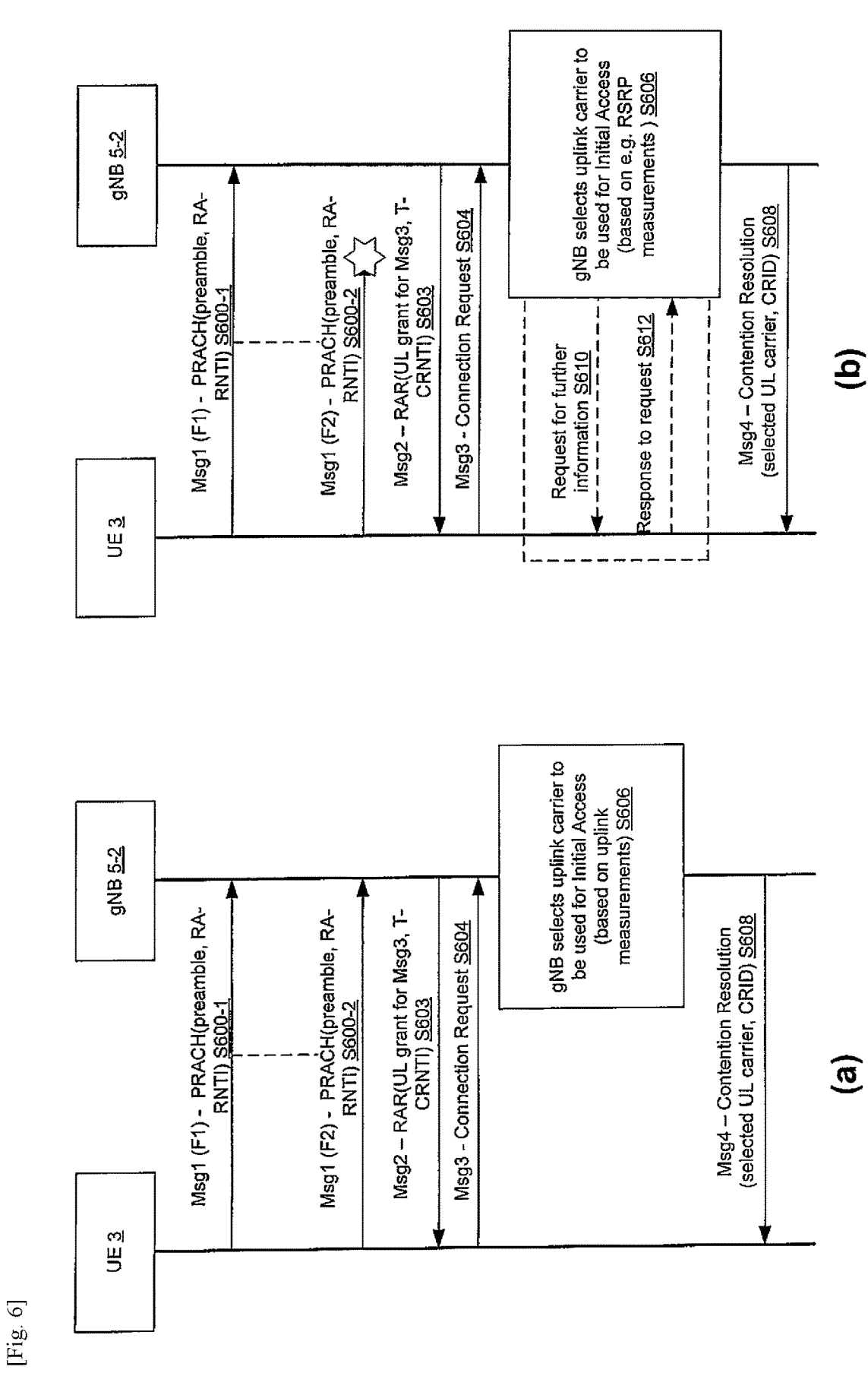
[Fig. 6]

UPLINK CARRIER SELECTION FOR PRACH TRANSMISSION BETWEEN A NR DEDICATED CARRIER AND A LTE/NR SHARED CARRIER

CROSS-REFERENCE TO RELATED APPLICATIONS

The present application is a continuation application of Ser. No. 17/546,635 filed on Dec. 9, 2021, which is a continuation application of U.S. patent application Ser. No. 16/623,006 filed on Dec. 16, 2019 and issued as U.S. Pat. No. 11,546,943 on Jan. 3, 2023, which is a National Stage Entry of international application PCT/JP2018/022568, filed on Jun. 13, 2018, which claims the benefit of priority from United Kingdom Patent Application No. 1709678.5 filed on Jun. 16, 2017, the disclosures of all of which are incorporated by reference in their entirety.

TECHNICAL FIELD

The present invention relates to a communication system. The invention has particular but not exclusive relevance to wireless communication systems and devices thereof operating according to the 3rd Generation Partnership Project (3GPP) standards or equivalents or derivatives thereof. The invention has particular although not exclusive relevance to uplink (UL) sharing between so called new radio (NR)/next generation (NG)/5G type communication equipment with long term evolution (LTE) type communication equipment, mechanisms for supporting provision of a supplementary uplink (SUL) carrier frequency, and in particular the efficient selection of UL carriers.

BACKGROUND ART

The latest developments of the 3GPP standards are referred to as the Long Term Evolution (LTE) of Evolved Packet Core (EPC) network and Evolved UMTS Terrestrial Radio Access Network (E-UTRAN), also commonly referred as '4G'. In addition, the term '5G' and 'new radio' (NR) refer to an evolving communication technology that is expected to support a variety of applications and services. Various details of 5G networks are described in, for example, the 'NGMN 5G White Paper' V1.0 by the Next Generation Mobile Networks (NGMN) Alliance, which document is available from https://www.ngmn.org/5g-white-paper.html. 3GPP intends to support 5G by way of the so-called 3GPP Next Generation (NextGen) radio access network (RAN) and the 3GPP NextGen core (NGC) network.

Under the 3GPP standards, a NodeB (or an 'eNB' in LTE, 'gNB' in 5G) is a base station via which communication devices (user equipment or 'UE') connect to a core network and communicate to other communication devices or remote servers. Communication devices might be, for example, mobile communication devices such as mobile telephones, smartphones, user equipment, personal digital assistants, laptop/tablet computers, web browsers, e-book readers and/or the like. Such mobile (or even generally stationary) devices are typically operated by a user (although it is also possible to connect so-called 'Internet of Things' devices and similar machine-type communication devices to the network). For simplicity, the present application will use the term base station to refer to any such base stations and use the term mobile device or UE to refer to any such communication device. The core network (e.g. the EPC in case of LTE or the NGC in case of NR/5G) hosts functionality for subscriber management, mobility management, charging, security, and call/session management (amongst others), and provides connection for communication devices to external networks, such as the Internet.

It has been proposed that a UE may be configured with a plurality of uplink (UL) carriers on different frequencies where there is at least one LTE carrier of a first frequency and at least one NR carrier of a second, different, carrier frequency. In one supported example, the UE may be restricted to (at a given time) operate on only on a single UL carrier of a given pair of carriers comprising an LTE carrier and an NR carrier. Nevertheless, simultaneous operation of a UE on two (or more UL carriers) is also supported.

Moreover, it has been proposed that provision should be made for a supplementary uplink (SUL) frequency to support the case where there is only uplink resource for a carrier from an NR perspective. The SUL frequency may be used to support a complimentary access link (including from random access point of view), to another NR dedicated uplink frequency (time division duplex (TDD) and/or for frequency division duplex (FDD)), whereby the UE may select physical random access channel (PRACH) resources either in the NR TDD/FDD uplink frequency or the SUL frequency.

The SUL frequency can be a frequency that is shared with the LTE UL (at least for the case when NR spectrum is below 6 GHz).

SUMMARY OF INVENTION

Technical Problem

The present invention seeks to provide methods and associated apparatus that support or improve upon one or more of the above proposals/agreements in an efficient and effective manner.

In considering the above proposals/agreements, the inventor has realised that the possibility of using a plurality of different UL carriers (e.g. SUL carrier and NR dedicated carrier) presents a number of issues, in particular in relation to the selection of UL carriers for initial access, which have yet to be resolved in an efficient manner. Specifically, the inventor has identified a need to balance the sometimes conflicting risks of: increased power consumption overhead; interference on PRACH resources; undesirable access times associated, for example, with repeated unsuccessful access attempts; and/or sub-optimal UL carrier selection arising from the use of measurement results that may not accurately reflect the relative UL carrier qualities.

For example, the SUL carrier operates in a scenario when there is only UL resource for a carrier from NR perspective. This presents a challenge for efficient and effective UL carrier selection because, whilst the UE is capable of estimating UL path-loss based on a DL signal plus a path-loss offset, there may be a very large frequency offset between the UL and DL (especially where the SUL operates in an LTE compatible range), which can cause path-loss estimation inaccuracy (there may, also for example, be UL-DL path-loss difference due to subcarrier spacing, antenna dimension). Thus, the UE may not be able to support accurate time/frequency tracking or path-loss estimation for the SUL carrier, based on a paired DL (or same frequency) carrier corresponding to the SUL carrier. Accordingly, reliance on DL measurement based estimates for informing UL carrier selection may result in higher incidences of sub optimum carrier selection. Furthermore, if a UE can only estimate coverage level based on DL measurement, there may be insufficient resource on a selected UL carrier leading to an increase in PRACH blocking rate and an associated reduction user data rate. This can lead to the need for a gNB to re-configure the initial carrier frequency selection and thus the potential for UE radio frequency retuning.

Solution to Problem

In one aspect of the invention there is provided a method performed by a user equipment (UE) in a cellular communication system, the method comprising: initiating a random access channel (RACH) procedure by sending at least one message comprising a random access preamble to apparatus of a radio access network (RAN), wherein the at least one message is sent using at least one uplink (UL) carrier of a plurality of UL carriers available for use by the UE; and receiving from the apparatus of the RAN, as part of the RACH procedure, an indication of an UL carrier selected by the apparatus of the RAN, from the plurality of UL carriers available for use by the UE.

In one aspect of the invention there is provided a method performed by apparatus of a radio access network (RAN) in a cellular communication system, the method comprising: receiving, from a user equipment (UE), at least one message comprising a random access preamble for initiating a random access channel (RACH) procedure, wherein the at least one message is received using at least one uplink (UL) carrier of a plurality of UL carriers available for use by the UE; selecting, from the plurality of UL carriers available for use by the UE, a UL carrier for subsequent use by the UE; and sending to the UE, as part of the RACH procedure, an indication of the UL carrier selected by the apparatus of the RAN, from the plurality of UL carriers available for use by the UE.

In one aspect of the invention there is provided a user equipment (UE) for a cellular communication system, the UE comprising: a transceiver and a controller wherein the controller is configured to control the transceiver to: initiate a random access channel (RACH) procedure by sending at least one message comprising a random access preamble to apparatus of a radio access network (RAN), wherein the at least one message is sent using at least one uplink (UL) carrier of a plurality of UL carriers available for use by the UE; and receive from the apparatus of the RAN, as part of the RACH procedure, an indication of an UL carrier selected by the apparatus of the RAN, from the plurality of UL carriers available for use by the UE.

In one aspect of the invention there is provided apparatus of a radio access network (RAN) for a cellular communication system, the apparatus comprising: a transceiver and a controller wherein the controller is configured to: control the transceiver to receive, from a user equipment (UE), at least one message comprising a random access preamble for initiating a random access channel (RACH) procedure, wherein the at least one message is received using at least one uplink (UL) carrier of a plurality of UL carriers available for use by the UE; select, from the plurality of UL carriers available for use by the UE, a UL carrier for subsequent use by the UE; and control the transceiver to send to the UE, as part of the RACH procedure, an indication of the UL carrier selected by the apparatus of the RAN, from the plurality of UL carriers available for use by the UE.

In one aspect of the invention there is provided a user equipment (UE) for a cellular communication system, the UE comprising: means for initiating a random access channel (RACH) procedure by sending at least one message comprising a random access preamble to apparatus of a radio access network (RAN), wherein the at least one message is sent using at least one uplink (UL) carrier of a plurality of UL carriers available for use by the UE; and means for receiving from the apparatus of the RAN, as part of the RACH procedure, an indication of an UL carrier selected by the apparatus of the RAN, from the plurality of UL carriers available for use by the UE.

In one aspect of the invention there is provided apparatus of a radio access network (RAN) for a cellular communication system, the apparatus comprising: means for receiving, from a user equipment (UE), at least one message comprising a random access preamble for initiating a random access channel (RACH) procedure, wherein the at least one message is received using at least one uplink (UL) carrier of a plurality of UL carriers available for use by the UE; means for selecting, from the plurality of UL carriers available for use by the UE, a UL carrier for subsequent use by the UE; and means for sending to the UE, as part of the RACH procedure, an indication of the UL carrier selected by the apparatus of the RAN, from the plurality of UL carriers available for use by the UE.

Aspects of the invention extend to computer program products such as computer readable storage media having instructions stored thereon which are operable to program a programmable processor to carry out a method as described in the aspects and possibilities set out above or recited in the claims and/or to program a suitably adapted computer to provide the apparatus recited in any of the claims.

Each feature disclosed in this specification (which term includes the claims) and/or shown in the drawings may be incorporated in the invention independently (or in combination with any other disclosed and/or illustrated features. In particular but without limitation the features of any of the claims dependent from a particular independent claim may be introduced into that independent claim in any combination or individually.

Example embodiments of the invention will now be described by way of example only with reference to the attached figures in which:

BRIEF DESCRIPTION OF DRAWINGS

FIG. 1 illustrates schematically a cellular telecommunication system;

FIG. 2 is a block diagram of user equipment which may form part of the system shown in FIG. 1;

FIG. 3 is a block diagram of a radio access network apparatus forming part of the system shown in FIG. 1;

FIG. 4 is a simplified message sequence diagram illustrating an exemplary way in which an initial access procedure may be implemented in the system of FIG. 1;

FIG. 5 is a simplified message sequence diagram illustrating another exemplary way in which an initial access procedure may be implemented in the system of FIG. 1;

FIG. 6 includes simplified message sequence diagrams (a) and (b) illustrating another exemplary way in which an initial access procedure may be implemented in the system of FIG. 1.

DESCRIPTION OF EMBODIMENTS

Overview

FIG. 1 schematically illustrates a telecommunication network 1 in which user equipment (UE) 3 (mobile telephones and/or other communication devices) can communicate with each other via radio access network (RAN) apparatus 5 which, in the illustrated example, comprises an LTE base station or 'eNB' 5-1, and NR/5G base station or 'gNB' 5-2, using an appropriate radio access technology (RAT). In this example, the UE 3 is capable of communicating as an LTE UE 3-1, which supports at least an LTE radio access technology, via the eNB 5-1 part of the RAN 5. The UE 3 is also capable of communicating as an NR/5G UE 3-2, which supports one or more 5G radio access technologies, via the gNB 5-2 part of the RAN apparatus 5. It will be appreciated, however, that the UE 3 need not have LTE capability and may only support the 5G capability.

As those skilled in the art will appreciate, whilst one mobile device 3 (with three possible UE configurations) and one base station 5 are shown in FIG. 1 for illustration purposes, the system, when implemented, will typically include other base stations and mobile devices.

In this example, the eNB 5-1 and gNB 5-2 of the RAN apparatus are co-located with each base station operating one or more associated cells. UEs 3 connect to an appropriate cell (depending on their location and possibly on other factors, e.g. signal conditions, subscription data, capability, and/or the like) by establishing a radio resource control (RRC) connection with the base station 5-1, operating that cell.

The RAN apparatus 5 is connected to a core network 7 via an appropriate interface. The core network 7 comprises the NR/5G functions required for supporting communication of the UE 3 via the gNB 5-2. The core network 7 includes, for example, functions for providing control plane management, user plane management, mobility management etc. . . . . The core network 7 also comprises partial or full EPC functionality for supporting communication of the UE 3 via the eNB 5-1.

The UE 3 and the RAN apparatus 5 are configured to use a plurality of carriers (or 'component carriers') for UE 3 to RAN apparatus 5 uplink (UL) communication and downlink (DL) communication RAN apparatus 5 to UE 3. These UL and DL carriers operate on a number of different carrier frequencies. The UL carriers include, in this example, a supplementary uplink (SUL) carrier on an SUL frequency (F1 in the illustrated example) and at least one dedicated NR dedicated UL carrier on a corresponding UL frequency (F2) that is different to that of the SUL carrier. In this example the SUL carrier is on a frequency that is within the range used in LTE and thus can thus be shared between LTE and NR (i.e. the LTE UL and NR UL share UL subframes of the LTE frequency). It will be appreciated, however, that the SUL carrier may be a dedicated NR UL carrier and may operate in a frequency range that is not normally used for LTE. The UL carriers may also include other UL carriers (e.g. an LTE dedicated UL carrier on another frequency). The DL carriers, in this example, include at least one carrier for NR DL transmission on a frequency (F3) that is different to the uplink (UL) frequencies and at least one carrier for LTE DL transmission on a frequency (Fn) that is different to the NR DL frequency.

Beneficially, the gNB 5-2 is configured to be able to select the UL carrier to be used by the UE 3 for initial UL access (for example to be either the supplementary UL frequency F1 or NR dedicated UL frequency F2). By having the gNB 5-2 configure the initial UL carrier selection for the NR UE, therefore, the gNB 5-2 is advantageously able to schedule the data and control channels taking into account coverage level and resource availability (which the gNB 5-2 will be able to estimate more accurately than the UE 3).

In order to support the gNB 5-2 to configure initial UE UL carrier selection, the UE 3 and gNB 5-2 are beneficially configured to use a modified UL initial access procedure that has the potential to reduce latency by avoiding unnecessary procedures (e.g. an RRC Connection Reconfiguration procedure).

Specifically, the gNB 5-2 is beneficially configured to provide an indication of the UL carrier selected for initial access, during the initial access procedure, before setup of a connection (e.g. an RRC connection) between the UE 3 and the gNB 5-2 has been completed (e.g. before an RRC connection completion message is sent from the UE 3 to the gNB 5-2). In the examples described below the indication is advantageously provided in Msg4 of a random access channel procedure (e.g. a connection resolution/RRC connection setup message) although it will be appreciated that the indication may be provided in any suitable message from the gNB 5-2 to UE 3.

A number of variations of a modified UL initial access procedures that can be used to provide an indication of the UL carrier selected for initial access are described in more detail later. Whilst all the procedures disclosed have different benefits and trade-offs compared to one another they each represent an efficient and effective way to perform selection of an UL carrier, by a gNB 5-2, to be used for initial access and to indicate the result of such a selection to the UE 3.

User Equipment

FIG. 2 is a block diagram illustrating the main components of the UE 3 shown in FIG. 1 (e.g. a mobile telephone or other user equipment). As shown, the UE 3 has a transceiver circuit 31 that is operable to transmit signals to and to receive signals from a base station 5-1,5-2 function of the RAN apparatus 5 via one or more antenna 33. The mobile device 3 has a controller 37 to control the operation of the mobile device 3. The controller 37 is associated with a memory 39 and is coupled to the transceiver circuit 31. Although not necessarily required for its operation, the mobile device 3 might of course have all the usual functionality of a conventional mobile telephone 3 (such as a user interface 35) and this may be provided by any one or any combination of hardware, software and firmware, as appropriate. Software may be pre-installed in the memory 39 and/or may be downloaded via the telecommunications network or from a removable data storage device (RMD), for example.

The controller 37 is configured to control overall operation of the UE 3 by, in this example, program instructions or software instructions stored within the memory 39. As shown, these software instructions include, among other things, an operating system 41, a communications control module 43 comprising a number of radio access technology module (such as an LTE module 44 and a NR/5G module to access compatible radio access networks, an initial access module 46, and a UL carrier management module 47.

The communications control module 43 is operable to control the communication between the UE 3 and a base station 5-1, 5-2 (and other communication devices connected to the base station 5-1, 5-2, such as further mobile devices and/or network nodes). The LTE module 44 is responsible for operating the UE as the LTE UE 3-1 and, in particular, for managing communication with the eNB 5-1 operating in accordance with current LTE standards (e.g. 3G/4G base station) and other nodes/devices connected to such a base station. The NR/5G module 45 is responsible for operating the UE as the NR/5G UE 3-2 and, in particular for managing communication with the gNB 5-2 operating in accordance with NextGen (5G) standards and other nodes/devices connected to such a NextGen base station.

The initial access module 46 is operable to control the UE 3 during initial access procedures with the eNB 5-1 and/or gNB 5-2 including the generation, transmission and reception of messages during a Physical Random Access Channel (PRACH) procedure. The initial access module 46 manages, for example: the generation and transmission of Msg1 carrying an appropriate random access preamble and temporary identifier (e.g. a random access radio network temporary identifier, RA-RNTI) and Msg3 (e.g. a connection request); and the reception and handling of any Msg0 assigning a preamble (e.g. if necessary for contention free access), Msg2 carrying a random access response (RAR) message, and any Msg4 (e.g. for contention resolution/ requesting connection setup). The initial access module 46 is also operable to identify the uplink carrier(s) to be used in the PRACH procedure (for example for Msg1 transmission). As described in more detail later, the UE3 may identify the uplink carrier(s) to be used for the PRACH procedure by selecting the uplink carrier itself and/or may identify the uplink carrier(s) to be used for the PRACH procedure based on a selection made by the gNB 5-2.

The UL carrier management module 47 manages the handling of UL carrier communication including, for example, the configuration of UL communication for initial access on an uplink carrier selected by the gNB 5-2, and indicated to the UE 3 in the initial access procedure (e.g. in Msg4).

RAN Apparatus

FIG. 3 is a block diagram illustrating the main components of the RAN apparatus 5 shown in FIG. 1. As shown, the RAN apparatus 5 has a transceiver circuit 51 for transmitting signals to and for receiving signals from the communication devices (such as UE 3) via one or more antenna 53, and at least one core network interface 55 for transmitting signals to and for receiving signals from the core network 7.

The RAN apparatus 5 has a controller 57 to control the operation of the RAN apparatus 5. The controller 57 is associated with a memory 59. Although not necessarily shown in FIG. 3, the RAN apparatus 5 will of course have all the usual functionality of a cellular telephone network base station and this may be provided by any one or any combination of hardware, software and firmware, as appropriate. Software may be pre-installed in the memory 59 and/or may be downloaded via the communications network 1 or from a removable data storage device (RMD), for example. The controller 57 is configured to control the overall operation of the RAN apparatus 5 by, in this example, program instructions or software instructions stored within the memory 59. As shown, these software instructions include, among other things, an operating system 61, a communications control module 63 comprising a number of base station modules (such as an eNB module 65 and a gNB module 67) to provide the functionality of a corresponding base station, an initial access management module 68, and a UL carrier management module 69.

The communications control module 63 is operable to control the communication between the RAN apparatus 5 and the UE 3 (and other network entities that are connected to the RAN apparatus 5). The eNB module 65 is responsible for operating the RAN apparatus 5 as the eNB 5-1 and, in particular, for managing communication with the UE 3 when operating in accordance with current LTE standards (and/or with one or more LTE dedicated UEs). The gNB module 67 is responsible for operating the RAN apparatus 5 as the gNB 5-2 and, in particular for managing communication with the UE 3 when operating as an NR UE in accordance with NextGen (5G) standards (and/or with one or more NR dedicated UEs).

The initial access management module 68 is operable to control the RAN apparatus 5 during initial access procedures with the UE 3 including the generation, transmission and reception of messages during a Physical Random Access Channel (PRACH) procedure. The initial access management module 68 manages, for example: the reception and handling of Msg1 carrying an appropriate random access preamble and temporary identifier (e.g. a random access radio network temporary identifier, RA RNTI) and Msg3 (e.g. a connection request); and the generation and transmission of any Msg0 assigning a preamble (e.g. if necessary for contention free access), Msg2 carrying a random access response (RAR) message, and any Msg4 (e.g. for resolution/ requesting connection setup). In particular, the initial access management module 68 is operable manage initial access procedures when operating as the gNB 5-2, in particular in relation to identification of the uplink carrier(s) to be used in the PRACH procedure (for example for Msg1 transmission). As described in more detail later, the gNB 5-2 may select the uplink carrier to be used for the PRACH procedure and signal this to the UE 3 using appropriate signalling (e.g. using synchronisation signals, via system information (e.g. in a master information block (MIB)), via other signals broadcast on the physical broadcast channel (PBCH), and/or using appropriately configured RRC signals).

The UL carrier management module 69 manages the handling of UL carrier communication including, for example, the configuration of UL communication for initial access on an uplink carrier selected by the gNB 5-2, and indicated to the UE 3 in the initial access procedure (e.g. in Msg4).

Method 1—Uplink Carrier for PRACH Preamble Indicated by gNB

FIG. 4 is a simplified message sequence diagram illustrating an exemplary way in which an initial access procedure may be implemented in the system of FIG. 1 to provide efficient and effective indication of a selected UL carrier from the gNB 5-2 (or gNB part of the RAN apparatus 5) to the UE 3.

As seen at S400, in this example, the NR gNB 5-2 indicate a carrier to be used for the PRACH procedure to the UE 3 on the NR DL using appropriate signalling (e.g. using synchronisation signals, via system information (e.g. in a master information block (MIB)), via other signals broadcast on the physical broadcast channel (PBCH), and/or using appropriately configured RRC signals).

Then at S402 the UE 3 sends, to the gNB 5-2, the first message of the PRACH procedure (commonly known in the art as 'Msg1') to the gNB 5-2 in order to initiate the random access procedure. The PRACH Msg1 will typically include a PRACH preamble sequence with a corresponding radio access radio network temporary identifier (RA-RNTI) and the selected preamble index. At this point, although not shown, the UE 3 starts monitoring a physical downlink control channel (PDCCH) associated with the RA-RNTI. In the absence of a response, this monitoring will typically continue for the number of subframes specified by predefined random access response window size.

At S403 the gNB 5-2 sends, to the UE 3, a random access response (RAR) message (commonly known in the art as 'Msg2') which carries an uplink grant for the next message from the UE 3 along with a temporary cell radio network temporary identifier ('Temporary C-RNTI' or 'T_CRNTI') and possibly a backoff indicator and/or timing advance command. The UE 3 detects the PDCCH associated with the RA-RNTI and identifies a downlink control indicator/information (DCI) carried by the PDCCH and required for decode a physical downlink shared channel (PDSCH). The UE 3 uses the DCI to decode the PDSCH and hence extract the information carried by the RAR message.

The UE 3 typically will check, at this stage, if the RAR message contains a backoff indicator (BI). If a BI is found, the UE 3 will typically set a corresponding backoff parameter as specified by the BI. If a BI is not found, the UE 3 will typically set the backoff parameter to be zero (0). The UE 3 will also check if the RAR message contains a random access preamble identifier that matches the one the UE 3 used in Msg1. If there is a match then the UE 3 assumes that the correct RAR message has been received, process any associated timing advance command in the RAR message, and processes the received UL grant value.

At S404 the UE 3 sends, to the gNB 5-2, the third message of the PRACH procedure (commonly known in the art as 'Msg3') to the gNB 5-2. The UE 3 transmits this message using a physical uplink shared channel (PUSCH) using the radio resource allocated by UL Grant specified by RAR message. The exact timing of the PUSCH transmission may be adjusted by a timing advance value contained in the RAR message.

At S406 the gNB 5-2 selects the uplink carrier to be used for initial access. It will be appreciated that whilst this step is shown as occurring after receipt of Msg3 it may occur at any suitable juncture including before Msg3 (or in parallel with other parts of the PRACH procedure). In this example, because the gNB 5-2 has only received the PRACH request (Msg1) on a single uplink carrier, the gNB is unable to obtain the results of measurements in the uplink for both uplink carriers. Accordingly, selection may take account information received from the UE 3 (e.g. reference signal received power (RSRP) for the DL, power headroom reports etc.) albeit that this information may not accurately reflect the path loss conditions experienced in the uplink. It will be appreciated that selection may also take account of uplink measurements for the uplink carrier on which the PRACH is received.

At S408, the gNB 5-2 informs the UE 3 of the selected UL carrier by, in this example, including an indication of UL carrier selection in a contention resolution message (commonly known in the art as 'Msg4') along with a contention resolution ID (CRID).

If necessary, the gNB 5-2 may request further information from the UE 3 (e.g. RSRP measurement, transmit power, power headroom report etc.), as indicated at S410. On receipt of the requested information, as indicated at S412, the gNB 5-2 may base its uplink carrier selection (or a decision to request the UE to re-initiate the PRACH procedure towards another carrier) on any such further information (e.g. the results of DL measurements) received from the UE 3.

Although not shown, the gNB 5-2 may also request the UE 3 to initiate the PRACH procedure using another carrier, and notify the PRACH resource accordingly. Typically, this may occur, for example, after the request/response for further information, but before the transmission of Msg4.

Method 2—Uplink Carrier for PRACH Preamble Selected by UE

FIG. 5 is a simplified message sequence diagram illustrating another exemplary way in which an initial access procedure may be implemented in the system of FIG. 1 to provide efficient and effective indication of a selected UL carrier from the gNB 5-2 (or gNB part of the RAN apparatus 5) to the UE 3.

The procedure is similar to that of FIG. 4 and accordingly, the description of corresponding steps of FIG. 4 applies to the procedure of FIG. 5 (even if not repeated for reasons of conciseness). Unlike the procedure of FIG. 4, however, in this example, as seen at S500, the UE 3 (and not the NR gNB 5-2) selects a carrier to be used for the PRACH procedure (e.g. based on path-loss estimates and/or a carrier priority assigned to each carrier to prioritise which carrier is selected first).

Then at S502 the UE 3 sends, to the gNB 5-2, the first message of the PRACH procedure to the gNB 5-2 in order to initiate the random access procedure, as described with reference to FIG. 4, including a PRACH preamble sequence with a corresponding RA-RNTI and the selected preamble index.

As described with reference to FIG. 4, at S503 the gNB 5-2 sends, to the UE 3, the RAR message (Msg2) which carries the uplink grant for Msg3 from the UE 3 along with the Temporary C-RNTI and possibly a backoff indicator and/or timing advance command.

As described with reference to FIG. 4, at S504 the UE 3 sends, to the gNB Msg3 to the gNB 5-2 in a physical uplink shared channel (PUSCH) using the radio resource allocated by UL Grant specified by RAR message. The exact timing of the PUSCH transmission may be adjusted by a timing advance value contained in the RAR message.

At S506 the gNB 5-2 selects the uplink carrier to be used for initial access. As described with reference to FIG. 4, it will be appreciated that whilst this step is shown as occurring after receipt of Msg3 it may occur at any suitable juncture including before Msg3 (or in parallel with other parts of the PRACH procedure). In this example, because the gNB 5-2 has only received the PRACH request (Msg1) on a single uplink carrier, the gNB 5-2 is unable to obtain the results of measurements in the uplink for both uplink carriers. Accordingly, selection may take account information received from the UE 3 (e.g. reference signal received power (RSRP) for the DL, power headroom reports etc.) albeit that this information may not accurately reflect the path loss conditions experienced in the uplink. It will be appreciated that selection may also take account of uplink measurements for the uplink carrier on which the PRACH is received.

At S508, as described with reference to FIG. 4, the gNB 5-2 informs the UE 3 of the selected UL carrier by, in this example, including an indication of UL carrier selection in a contention resolution message (Msg4) along with a contention resolution ID (CRID).

Although not shown, the gNB 5-2 may also request the UE 3 to initiate the PRACH procedure using another carrier, and notify the PRACH resource accordingly.

If necessary, the gNB 5-2 may request further information from the UE 3 (e.g. RSRP measurement, power headroom report etc.), as indicated at S510. On receipt of the requested information, as indicated at S512, the gNB 5-2 may base its uplink carrier selection on any such further information received from the UE 3 (or decision to request the UE to re-initiate the PRACH procedure towards another carrier).

Analysis of Methods 1 and 2

It can be seen, that in methods 1 and 2 only a selected number of UEs have to transmit PRACH preambles on both uplink frequencies which provides potential benefits from a UE power consumption point of view. This also means that the risk of interference on PRACH resources is minimised because the number of UEs using each UL carrier for PRACH is also minimised.

Thus, whilst PRACH blocking on a selected UL carrier for a given UE may result in repeated attempts to gain initial access, and whilst the determination, by the gNB 5-2 of the need to transmit PRACH towards another carrier is based on a UE's RSRP measurement (which may be inaccurate) the UE is nevertheless still able to gain UL initial access using the optimal carrier with reduced latency.

Method 3—Plural Uplink Carriers Used for PRACH Preamble

FIGS. 6(a) and (b) are simplified message sequence diagram illustrating another exemplary way in which an initial access procedure may be implemented in the system of FIG. 1 to provide efficient and effective indication of a selected UL carrier from the gNB 5-2 (or gNB part of the RAN apparatus 5) to the UE 3.

The procedure is similar to that of FIGS. 4 and 5 and accordingly, the description of corresponding steps of FIGS. 4 and 5 applies to the procedure of FIG. 6 (even if not repeated for reasons of conciseness).

Unlike the procedures of FIGS. 4 and 5, in this example, there is no pre-selection of a UL carrier for PRACH preamble transmission. Instead, the UE 3 transmits PRACH preambles on both UL carriers. Specifically, as seen from S600-1 to S600-2, the UE 3 sends, consecutively on each respective carrier, a plurality of Msg1 type messages (where each Msg1 is as described with reference to FIGS. 4 and 5). The transmission of Msg1 for a particular carrier may, however, be conditional on an estimated path-loss on that carrier, based on a DL measurement, being below some predetermined threshold.

FIG. 6(a) illustrates the procedure when the gNB 5-2 receives preambles on both carriers from the same UE 3. FIG. 6(b) illustrates the procedure when the gNB 5-2 receives preambles on only a single carrier from the UE 3.

At S603 the gNB 5-2 sends, to the UE 3, the random access response (RAR) message ('Msg2') which carries an uplink grant for the next message from the UE 3 along with a temporary cell radio network temporary identifier ('Temporary C-RNTI' or 'T_CRNTI') and possibly a backoff indicator and/or timing advance command (broadly as described with reference to FIGS. 4 and 5).

At S604 the UE 3 sends, to the gNB 5-2, Msg3 to the gNB 5-2 in a physical uplink shared channel (PUSCH) using the radio resource allocated by UL Grant specified by RAR message (broadly as described with reference to FIGS. 4 and 5).

If the gNB 5-2 has received preambles on both carriers from the same UE 3 (as shown in FIG. 6(a)) the gNB 5-2 makes a selection, at S606, of UL carrier based on UL measurements taken for the received uplink signals.

If the gNB 5-2 detects preambles on only a subset of the carriers (e.g. a single carrier) as shown in FIG. 6(b), than the UE 3 (e.g. RSRP measurement, power headroom report etc.), as indicated at S610. On receipt of the requested information, as indicated at S612, the gNB 5-2 may base its uplink carrier selection on any such further information (DL measurements) received from the UE 3.

At S608, as described with reference to FIGS. 4 and 5, the gNB 5-2 informs the UE 3 of the selected UL carrier by, in this example, including an indication of UL carrier selection in a contention resolution message (Msg4) along with a contention resolution D (CRID).

Upon receiving notification of the GNB UL carrier selection, the UE 3 stops attempts to transmit Msg1.

Analysis of Method 3

It can be seen that, in method 3, the UE 3 is able to gain UL initial access on the optimal carrier in a relatively short (and hence advantageous) timescale. Moreover, the gNB 5-2 can make the UL carrier selection based on accurate UL measurements (when it receives preambles on both carriers).

Thus, whilst there may be a small overhead associated with the transmission of PRACH preambles on both uplink carriers (from UE power consumption point of view), and method 3 has the potential for more interference on PRACH resources compared to methods 1 and 2 (albeit mitigated by the relatively shorter PRACH transmission time), the UE is nevertheless still able to gain UL initial access using the optimal carrier with reduced latency.

Accordingly, method 3's switching of PRACH preamble sequence transmission on the available UL carriers (F1 and F2) for the initial access attempts (Msg1) can be a particularly effective option either in isolation, or at least after a few unsuccessful attempts on one chosen carrier. NR can support multiple Msg1 transmissions consecutively for different UL carriers at the start of a monitored RAR window in both contention-free and contention-based random access, or consecutive transmission of Msg1 for different UL carriers in contention free random access after the end of a monitored RAR window. NR supports Msg2 and Msg3 transmission timings in units of slots or 'mini-slot' (currently the smallest possible scheduling unit in the time domain—i.e. smaller than a slot).

The above mechanisms thus have the potential to improve user data rate, and reduce the total number of attempts for a UE to gain access, especially compared to a scenario in which there is a high PRACH blocking rate due to limited resource on a particular carrier.

MODIFICATIONS AND ALTERNATIVES

Detailed example embodiments have been described above. As those skilled in the art will appreciate, a number of modifications and alternatives can be made to the above example embodiments whilst still benefiting from the inventions embodied therein. By way of illustration only a number of these alternatives and modifications will now be described.

It will be appreciated, for example, that whilst the exemplary system describes RAN apparatus in which the eNB and gNB are co-located and share a number of hardware and software modules, the eNB and gNB may be separate having their own dedicated hardware and software. The RAN apparatus may, in accordance with known 5G developments, have its functionality split between at least one distributed (or 'remote') unit (DU) which communicates with the UE, and a central unit (CU) between the DU and the core network. For example higher layer functionality may be provided by the CU while lower layer functionality may be provided by the DU.

It will be appreciated that the term 'component carrier' or 'carrier as used in the description to refer to UL carriers and DL carriers, represents a distinct communication (or 'transmission') bandwidth within which individual time/frequency resources (e.g. physical resource blocks (PRBs)) may be scheduled. The term 'carrier' in this context should not be confused with the term 'sub-carrier', which represents the smallest unit of frequency used in a cellular communication system such as that described and which are typically allocated in groups (typically called PRBs) within a given communication time interval (e.g. a transmission time interval (TTI), mini-slot, slot, sub-frame or the like).

Thus, a component carrier represents a transmission (UL, DL or both) bandwidth comprising a plurality (typically many tens) of PRBs, each of which comprises a plurality of (typically many, e.g. 12) sub-carriers. In other words, the transmission bandwidth associated with each carrier typically comprises several hundred sub-carriers.

It will be appreciated that the request that the RACH procedure should be re-initiated using a different UL carrier may implicitly or explicitly provide the indication of an UL carrier selected by the gNB.

It will be appreciated that an appropriately adapted Msg2 may be used for the request for further information by the gNB, and an appropriately adapted Msg2 for the response from the UE. The messages may be adapted, for example, by adding additional fields for information elements for the request/response.

A request to initiate the PRACH procedure using another carrier (and/or a request for further information) may be triggered when an estimated path-loss on the carrier(s), based on DL measurement is below some threshold. It will be appreciated that a request to initiate the PRACH procedure using another carrier may be used to allow UL measurements to be made for the new carrier as well as the original carrier on which the PRACH was transmitted and may thus also be regarded as a 'request for further measurement'. The gNB may make such a request by, for example, sending the preamble(s) for the new carrier. Moreover, alternatively, or additionally, the gNB may request (as part of a request to initiate the PRACH procedure using another carrier or as a different request) UL transmission on some configured UL reference signal subcarrier to allow the uplink to be measured (i.e. to provide basis for a more accurate path loss estimate for the corresponding uplink carrier). The UE 3 may transmit such a UL reference signal using the gap that exists in time domain (or frequency domain) for transmission of Msg1. It will be appreciated that, advantageously, a UE identifier (UE-ID) may be transmitted with the PRACH preamble(s), in such a request, to allow the correct UE to identify that the request is addressed to it.

It will be appreciated that a similar RACH procedure to those shown in and described with reference to FIGS. 4 to 6 could be used to support the gNB to update UE UL carrier selection during the RACH procedure. Specifically for example, when a UE has been notified of a UL carrier selected by the gNB for initial access, the gNB may update the UL carrier selected later and inform the UE accordingly, during a further RACH procedure (e.g. as shown in and described with reference to FIGS. 4 to 6).

In the above example embodiments, a number of software modules were described. As those skilled in the art will appreciate, the software modules may be provided in compiled or un-compiled form and may be supplied to the apparatus in question (UE, RAN, NB, gNB etc.) as a signal over a computer network, or on a recording medium. Further, the functionality performed by part or all of this software may be performed using one or more dedicated hardware circuits. However, the use of software is preferred as it facilitates the updating of the base station or the mobile device in order to update their functionalities.

Each controller forming part of an apparatus described herein may comprise any suitable form of processing circuitry including (but not limited to), for example: one or more hardware implemented computer processors; microprocessors; central processing units (CPUs); arithmetic logic units (ALUs); input/output (TO) circuits; internal memories/caches (program and/or data); processing registers; communication buses (e.g. control, data and/or address buses); direct memory access (DMA) functions; hardware or software implemented counters, pointers and/or timers; and/or the like.

Various other modifications will be apparent to those skilled in the art and will not be described in further detail here.

The whole or part of the example embodiments described above can be described as, but not limited to, the following supplementary notes.

(Supplementary Note 1)
A method performed by a user equipment (UE) in a cellular communication system, the method comprising:
initiating a random access channel (RACH) procedure by sending at least one message comprising a random access preamble to apparatus of a radio access network (RAN), wherein the at least one message is sent using at least one uplink (UL) carrier of a plurality of UL carriers available for use by the UE; and
receiving from the apparatus of the RAN, as part of the RACH procedure, an indication of an UL carrier selected by the apparatus of the RAN, from the plurality of UL carriers available for use by the UE.

(Supplementary Note 2)
A method as claimed in Supplementary note 1 wherein the at least one UL carrier used to send the message comprising a random access preamble comprises a UL carrier that has previously been indicated by the apparatus of the RAN.

(Supplementary Note 3)
A method as claimed in Supplementary note 1 wherein the at least one UL carrier used to send the message comprising a random access preamble comprises a UL carrier that has been selected by the UE.

(Supplementary Note 4)
A method as claimed in any of Supplementary notes 1 to 3 comprising receiving a request that the RACH procedure should be re-initiated using a different carrier of the plurality of UL carriers.

(Supplementary Note 5)
A method as claimed in Supplementary note 4 wherein the request that the RACH procedure should be re-initiated using a different of the plurality of UL carriers comprises at least one of a PRACH preamble for the different carrier of the plurality of UL carriers and an identifier of the UE.

(Supplementary Note 6)
A method as claimed in Supplementary note 4 or 5 wherein the request that the RACH procedure should be re-initiated using a different plurality of UL carriers provides the indication of an UL carrier selected by the apparatus of the RAN, from the plurality of UL carriers available for use by the UE.

(Supplementary Note 7)
A method as claimed in any of Supplementary notes 1 to 6 further comprising receiving a request for further information for informing selection of a UL carrier by the apparatus of the RAN (e.g. at least one of a reference signal received power (RSRP) measurement and a power headroom report).

(Supplementary Note 8)
A method as claimed in Supplementary note 7 further comprising providing the requested further information.

(Supplementary Note 9)
A method as claimed in any of Supplementary notes 1 to 7 further comprising receiving a request for UL transmission on a UL reference signal subcarrier and transmitting a reference signal on the UL reference signal subcarrier.

(Supplementary Note 10)

A method as claimed in any of Supplementary notes 1 to 9 wherein selection of an UL carrier by the apparatus of the RAN is based on at least one UL measurement in relation to the at least one uplink (UL) carrier of the plurality of UL carriers on which the at least one message comprising a random access preamble is sent.

(Supplementary Note 11)

A method as claimed in Supplementary note 1 wherein the initiating comprises sending a plurality of messages, each comprising a random access preamble, to apparatus of a radio access network (RAN), wherein each of the plurality of messages is sent using a different one of the plurality of UL carriers available for use by the UE.

(Supplementary Note 12)

A method as claimed in Supplementary note 11 when the apparatus of the RAN receives respective preambles on each of the plurality of carriers, selection of an UL carrier by the apparatus of the RAN is based on UL measurements.

(Supplementary Note 13)

A method as claimed in Supplementary note 11 or 12 wherein when the apparatus of the RAN does not receive respective preambles on all of the plurality of carriers, the apparatus of the RAN sends a request for further information for informing selection of a UL carrier by the apparatus of the RAN (e.g. at least one of a reference signal received power (RSRP) measurement and a power headroom report) and the method further comprises receiving the request for further information.

(Supplementary Note 14)

A method as claimed in Supplementary note 13 further comprising providing the requested further information.

(Supplementary Note 15)

A method as claimed in any of Supplementary notes 1 to 14 wherein at least one carrier of the plurality of UL carriers is a new radio (NR) or 5G dedicated UL carrier (e.g. having an associated communication bandwidth that is not shared with LTE).

(Supplementary Note 16)

A method as claimed in any of Supplementary notes 1 to 15 wherein at least one carrier of the plurality of UL carriers is a supplementary UL (SUL) carrier.

(Supplementary Note 17)

A method as claimed in Supplementary note 16 wherein the SUL carrier is a UL carrier that is shared between new radio (NR) or 5G type communication systems and long term evolution (LTE) type communication systems (e.g. having an associated communication bandwidth that may be used by both systems).

(Supplementary Note 18)

A method as claimed in any of Supplementary notes 1 to 17 wherein the indication of an UL carrier selected by the apparatus of the RAN is received before a connection to the apparatus of the RAN is complete (e.g. before a connection completion message is sent by the UE).

(Supplementary Note 19)

A method as claimed in any of Supplementary notes 1 to 18 wherein the indication of an UL carrier selected by the apparatus of the RAN is received in message 4 (Msg4—e.g. a contention resolution message) of the RACH procedure.

(Supplementary Note 20)

A method as claimed in any of Supplementary notes 1 to 19 wherein the apparatus of the RAN comprises a new radio (NR) or 5G base station (gNB).

(Supplementary Note 21)

A method as claimed in any of Supplementary notes 1 to 20 wherein the apparatus of the RAN comprises a long term evolution (LTE) base station (eNB).

(Supplementary Note 22)

A method as claimed in any of Supplementary notes 1 to 21 further comprising during a subsequent RACH procedure a further indication of an UL carrier selected by the apparatus of the RAN, from the plurality of UL carriers available for use by the UE, to update the UL carrier used by the UE.

(Supplementary Note 23)

A method performed by apparatus of a radio access network (RAN) in a cellular communication system, the method comprising:

receiving, from a user equipment (UE), at least one message comprising a random access preamble for initiating a random access channel (RACH) procedure, wherein the at least one message is received using at least one uplink (UL) carrier of a plurality of UL carriers available for use by the UE;

selecting, from the plurality of UL carriers available for use by the UE, a UL carrier for subsequent use by the UE; and sending to the UE, as part of the RACH procedure, an indication of the UL carrier selected by the apparatus of the RAN, from the plurality of UL carriers available for use by the UE.

(Supplementary Note 24)

A user equipment (UE) for a cellular communication system, the UE comprising:

a transceiver and a controller wherein the controller is configured to control the transceiver to:

initiate a random access channel (RACH) procedure by sending at least one message comprising a random access preamble to apparatus of a radio access network (RAN), wherein the at least one message is sent using at least one uplink (UL) carrier of a plurality of UL carriers available for use by the UE; and receive from the apparatus of the RAN, as part of the RACH procedure, an indication of an UL carrier selected by the apparatus of the RAN, from the plurality of UL carriers available for use by the UE.

(Supplementary Note 25)

Apparatus of a radio access network (RAN) for a cellular communication system, the apparatus comprising:

a transceiver and a controller wherein the controller is configured to:

control the transceiver to receive, from a user equipment (UE), at least one message comprising a random access preamble for initiating a random access channel (RACH) procedure, wherein the at least one message is received using at least one uplink (UL) carrier of a plurality of UL carriers available for use by the UE;

select, from the plurality of UL carriers available for use by the UE, a UL carrier for subsequent use by the UE; and control the transceiver to send to the UE, as part of the RACH procedure, an indication of the UL carrier selected by the apparatus of the RAN, from the plurality of UL carriers available for use by the UE.

(Supplementary Note 26)

A cellular communication system, the apparatus comprising at least one apparatus according to Supplementary note 25 and at least one user equipment according to Supplementary note 24.

(Supplementary Note 27)

A computer implementable instructions product comprising computer implementable instructions for causing a programmable device to become configured as apparatus according to Supplementary note 25 or as a user equipment according to Supplementary note 24.

The invention claimed is:

1. A method performed by a communication device configured with at least one uplink (UL) carrier, the method comprising:
receiving, from a communication apparatus, a UL carrier indicator indicating which of a non-supplementary UL (non-SUL) carrier and a supplementary UL (SUL) carrier to use for a physical random access channel transmission; and
determining one UL carrier used for the physical random access channel transmission, based on the UL carrier indicator;
wherein:
the non-SUL carrier corresponds to an operating frequency band on a first Radio Access Technology (RAT), and
the SUL carrier corresponds to an operating frequency band on the first RAT and a second RAT.

2. The method according to claim 1, wherein the receiving the UL carrier indicator is before establishment of a connection to the communication apparatus is complete.

3. A method performed by a communication apparatus, the method comprising:
sending, to a communication device configured with at least one uplink (UL) carrier, a UL carrier indicator indicating which of a non-supplementary UL (non-SUL) carrier and a supplementary UL (SUL) carrier to use for a physical random access channel transmission;
wherein:
the UL carrier indicator is used by the communication device to determine one UL carrier used for the physical random access channel transmission,
the non-SUL carrier corresponds to an operating frequency band on a first Radio Access Technology (RAT), and
the SUL carrier corresponds to an operating frequency band on the first RAT and a second RAT.

4. A communication device configured with at least one uplink (UL) carrier, the communication device comprising:
a transceiver circuit; and
a controller, wherein the controller is configured to:
control the transceiver circuit to receive, from a communication apparatus, a UL carrier indicator indicating which of a non-supplementary UL (non-SUL) carrier and a supplementary UL (SUL) carrier to use for a physical random access channel transmission, and
determine one UL carrier used for the physical random access channel transmission, based on the UL carrier indicator;
wherein:
the non-SUL carrier corresponds to an operating frequency band on a first Radio Access Technology (RAT), and
the SUL carrier corresponds to an operating frequency band on the first RAT and a second RAT.

5. A communication apparatus comprising:
a transceiver circuit; and
a controller, wherein the controller is configured to:
control the transceiver circuit to send, to a communication device configured with at least one uplink (UL) carrier, a UL carrier indicator indicating which of a non-supplementary UL (non-SUL) carrier and a supplementary UL (SUL) carrier to use for a physical random access channel transmission;
wherein:
the UL carrier indicator is used by the communication device to determine one UL carrier used for the physical random access channel transmission,
the non-SUL carrier corresponds to an operating frequency band on a first Radio Access Technology (RAT), and
the SUL carrier corresponds to an operating frequency band on the first RAT and a second RAT.

* * * * *